United States Patent
Hill

(10) Patent No.: US 6,925,301 B2
(45) Date of Patent: Aug. 2, 2005

(54) REMOTE ESTIMATION OF AMPLIFIER FUNCTIONALITY

(75) Inventor: Thomas C. Hill, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 482 days.

(21) Appl. No.: 10/223,862

(22) Filed: Aug. 19, 2002

(65) Prior Publication Data

US 2004/0203427 A1 Oct. 14, 2004

(51) Int. Cl.[7] .......................... H04Q 7/20; H03C 1/62; H04B 17/00
(52) U.S. Cl. .................. 455/423; 455/424; 455/115.1; 455/115.2; 455/115.3; 455/115.4; 455/67.11; 455/67.14; 455/226.1; 455/226.2; 455/226.3; 455/226.4
(58) Field of Search ................................ 455/423, 424, 455/115.1, 115.4, 226.1, 226.2, 226.3, 226.4, 67.7, 67.11, 67.14, 341, 343.1

(56) References Cited

U.S. PATENT DOCUMENTS

| | | | | |
|---|---|---|---|---|
| 5,450,623 A | * | 9/1995 | Yokoyama et al. | 455/67.13 |
| 6,131,020 A | * | 10/2000 | Oja et al. | 455/423 |
| 6,308,065 B1 | * | 10/2001 | Molinari et al. | 455/423 |
| 6,625,428 B1 | * | 9/2003 | Finnell et al. | 455/423 |

* cited by examiner

Primary Examiner—Lee Nguyen
Assistant Examiner—Wen Huang
(74) Attorney, Agent, or Firm—Francis I. Gray

(57) ABSTRACT

A method of remotely estimating the functionality of a preamplifier mounted adjacent an antenna at the top of a mast or tower and coupled to a base station via a transmission medium, such as a coaxial cable, includes taking noise and/or signal power measurements at the base station via the coaxial cable for the amplifier when both powered and unpowered. The ratio of the respective noise and/or signal powers, after the receiver noise figure at the base station and the cable loss (estimated or measured) including any connection device loss are accounted for, provides an estimate of the functionality of the amplifier.

28 Claims, 2 Drawing Sheets

REMOTE ESTIMATION OF AMPLIFIER FUNCTIONALITY

BACKGROUND OF THE INVENTION

The present invention relates to component subsystem measurements, and more particularly to the remote estimation of amplifier functionality using a measurement instrument coupled to the amplifier via a transmission medium.

A traditional method of measuring the frequency response of an amplifier is to couple the amplifier's input and output to a network analyzer or similar device, such as a spectrum analyzer with a tracking generator or the like, and to apply a swept frequency signal to the amplifier from the analyzer. The network analyzer measures the output of the amplifier over the swept frequency range and provides a frequency versus amplitude display of the output. This type of measurement is usually performed in a laboratory or shop where the amplifier is easily accessible.

Measuring the response of an amplifier becomes much more difficult when the amplifier is positioned adjacent to an antenna that is not easily accessible. Such configurations are used with telecommunication systems, such as wireless communications systems and the like, deep space satellite antennas, radio astronomy antennas and the like. In a wireless communications system the antenna is generally positioned on a tower, side of a building or the like to provide the maximum coverage area for the antenna. A preamplifier is mounted in a weather-proof box close to the antenna and is coupled to receive the signal from the antenna. The preamplifier amplifies the signal and couples the signal out of the box via a transmission cable, such as a coaxial cable, to a base station remote from the antenna. The cable enters the base station and may be connected via a jumper cable directly to an equipment rack that generally has a tap for connecting test equipment to the transmission cable. Power for the preamplifier is provided from the equipment rack. Alternatively, a jumper cable may connect the transmission line to a junction box that receives an alternating current (AC) voltage input. The AC voltage is converted to direct current (DC) voltages for powering the preamplifier. A second jumper cable connects the junction box to the equipment rack.

Measuring the parameters of the preamplifier in situ at the top of an antenna tower currently requires a technician to climb the tower with a portable network analyzer or the like. The technician opens up the weather-proof box containing the preamplifier and disconnects it from the antenna and transmission cable, connects the network analyzer to its input and output, and measures its frequency response. After completing the test the technician reconnects the amplifier to the antenna and transmission cable, reseals the weather-proof box and descends the tower.

There are a number of drawbacks to the above method of determining the functionality of a preamplifier mounted adjacent to a remote antenna. The first is that the weather-proof box has to be opened when testing the preamplifier. Generally, once the box is opened the weather-proof integrity of the box is compromised. It is very difficult to completely reseal the box to prevent ingress of moisture into the box. Second, the technician authorized to make the measurement may not be the same technician that supports the base station. Thus, it requires more than one individual to maintain the antenna and base station. This results in added overhead. Further, company and/or government safety requirements may dictate that special equipment, emergency support, special training and the like be used and provided for anyone climbing the tower. Again, this adds costly overhead to the operation of the tower and base station.

What is needed is a method of estimating the functionality of an amplifier that is remotely located from a measurement instrument.

BRIEF SUMMARY OF THE INVENTION

Accordingly, the present invention provides a method of remotely providing an estimate of the functionality of an amplifier situated adjacent to a receiver antenna in a telecommunications system or the like where the antenna is located at a distance from a base station where measurements are taken. The amplifier is coupled to the base station via a transmission medium, such as a coaxial cable, and a measurement instrument is coupled to the transmission medium at the base station. The measurement instrument may be used to control power to the amplifier. The measurement instrument obtains measures of output power for the amplifier both when power is applied to the amplifier and when power is not applied to the amplifier. The measures may be based on frequency spectra data within a measurement frequency spectrum range, and may be taken for either or both a constant signal channel within the measurement frequency range and/or a region within the measurement frequency range where signals are absent. Taking into consideration a receiver noise figure and a value for the transmission medium loss, including any connection devices, between the measurement instrument and the amplifier, the estimate is determined from the measures for display in a usable format.

The objects, advantages and other novel features of the present invention are apparent from the following detailed description when read in conjunction with the appended claims and attached drawing.

DETAILED DESCRIPTION OF THE INVENTION

Figure 1:
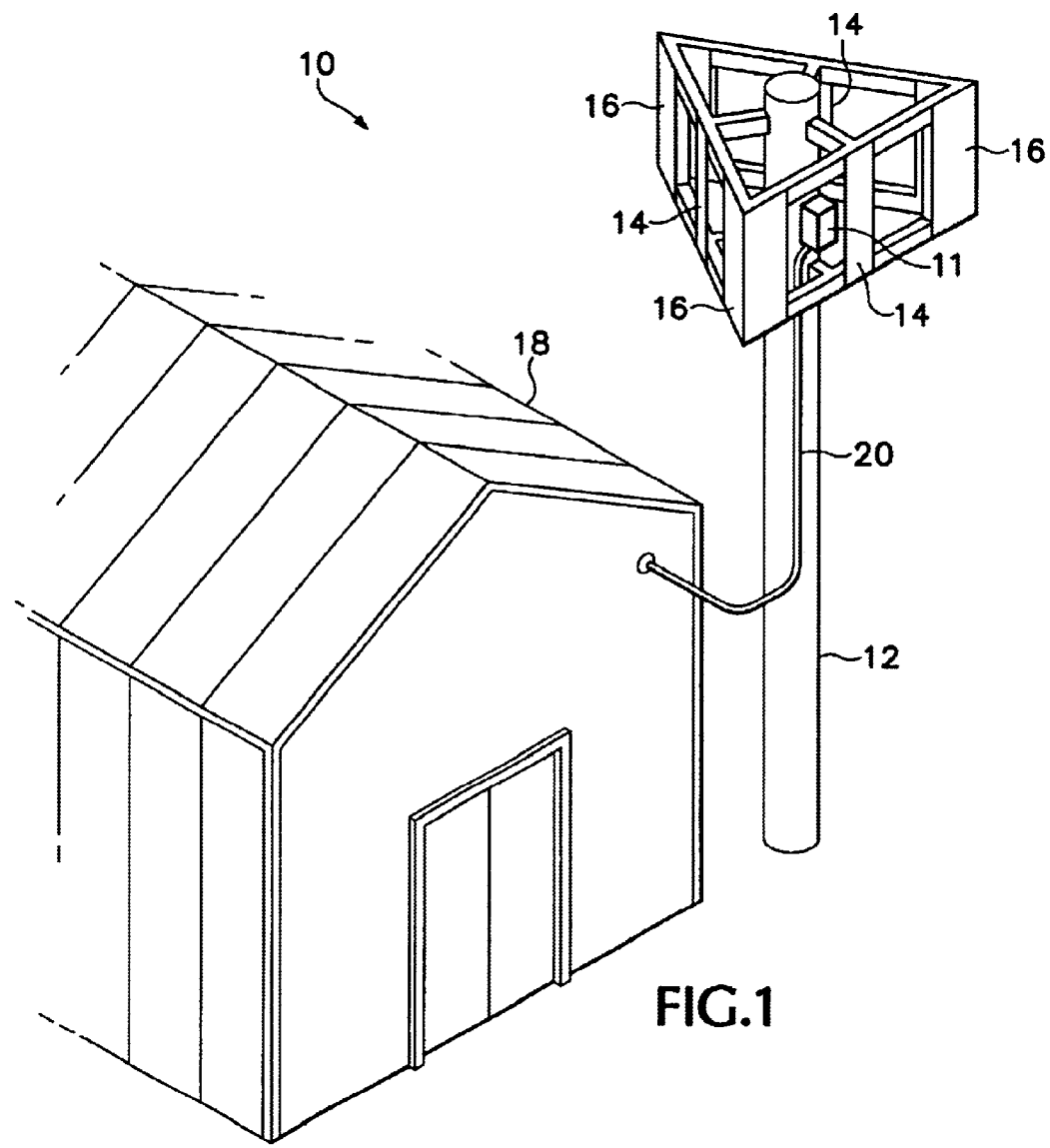
FIG. 1 is a perspective view of a wireless communications cell site having an antenna with associated amplifier mounted remotely from a base station.

Referring to FIG. 1 a wireless communications cell site 10 is shown having an antenna-mounted amplifier, or preamplifier 11, that requires testing to estimate if the amplifier is functioning properly. The cell site includes a mast or tower 12 on which are mounted transmitting and receiving antennas 14 and 16. Generally, each cell site 10 has three sets of transmitting and receiving antennas 14, 16 positioned in a triangular array. Each side of the triangular array has a transmitting and receiving antenna set with two receiving antennas 16 mounted toward the ends of the side and a transmitter antenna 14 mounted between the receiver antennas toward the middle. The cell site 10 may be set-up with amplifiers 11 connected to each of the receiver antennas 16 at the top of the mast or tower 12. The amplifiers 11 are secured in weather-proof housings to protect them from the elements. The outputs of the amplifiers 11 are coupled to a base station 18 via coaxial cables 20. Inside the base station 18 are equipment racks containing transmitting, receiving, processing and switching equipment that control the transmitting and receiving of cell phone traffic. The coaxial cables 20 are connected to the receiver equipment, which provides power to the amplifiers 11 at the top of the mast or tower 12. Generally, power is provided to each of the amplifiers 11 via the center conductor of the coaxial cable 20.

Figure 2:
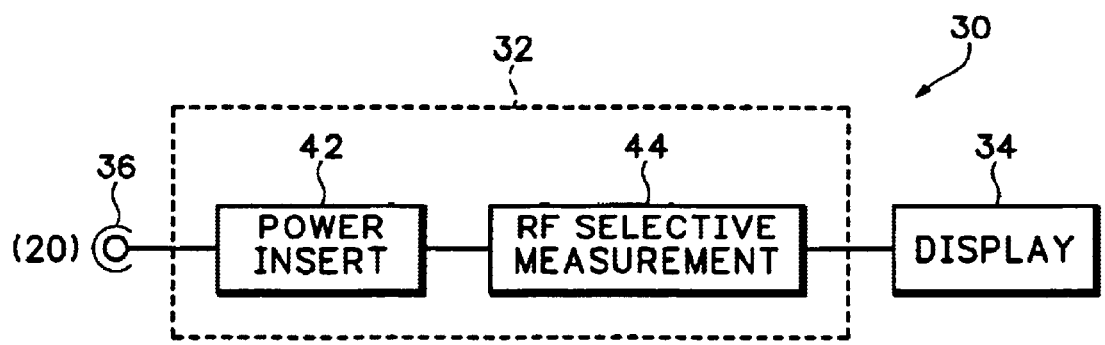
FIG. 2 is a general block diagram of a measurement instrument capable of remotely estimating the functionality of an amplifier according to the present invention.

FIG. 2 shows generically a measurement instrument 30 usable for remotely estimating the functionality of the preamplifier 11 at the top of the mast or tower 12. In the preferred embodiment, the measurement instrument 30 is a modular system having an RF measurement module 32 and a control and display module 34, such as the YBT250*Y350C NetTek™ BTS Field Tool, manufactured and sold by Tektronix, Inc., Beaverton, Oreg. The RF measurement module 32, such as a spectrum analyzer module, may be a two stage down converter that is tunable over a range of frequencies covering the various analog and digital wireless communications, cellular (800–1000 MHz) and PCS (Personal Communications Service—1700–2000 MHz) standards. The RF measurement module 32 has a coaxial input connector 36 that is coupled to the coaxial cable 20 coming from the amplifiers 11 mounted adjacent to the receiver antenna 16 on the tower 12. This connection is preferably made within the base station 18. Typically dual signal paths within the RF measurement module 32 couple the coaxial input connector 36 to a power insertion unit 42. One signal path is a straight through connection that bypasses the power insertion unit 42, while the other input path provides power to the amplifier 11 and amplifies the incoming signal. The powered signal path provides a voltage to the center conductor of the coaxial input connector 36. The output of the power insertion unit 42 is coupled to an RF selective measurement unit 44 which in turn provides measurement results to the control and display module 34. In the preferred implementation of the RF measurement instrument 30, the control and display module 34 has a touch screen display with front panel controls incorporated into the display as display knobs, scroll bars, touch pads and the like. The RF measurement instrument 30 in the preferred embodiment of the invention may be a personal computer (PC) based system functioning under the overall control of a WINDOWS® CE operating system, manufactured and sold by Microsoft, Corp., Redmond, Wash. The RF measurement instrument 30 may also be configured as a single instrument having separate DSP and system controllers and separate DSP and system memories. Additionally, the RF measurement instrument 30 may also be configured with the DSP controller and the system controller being a single device and the DSP and system memory being combined into a single memory.

Figure 3:
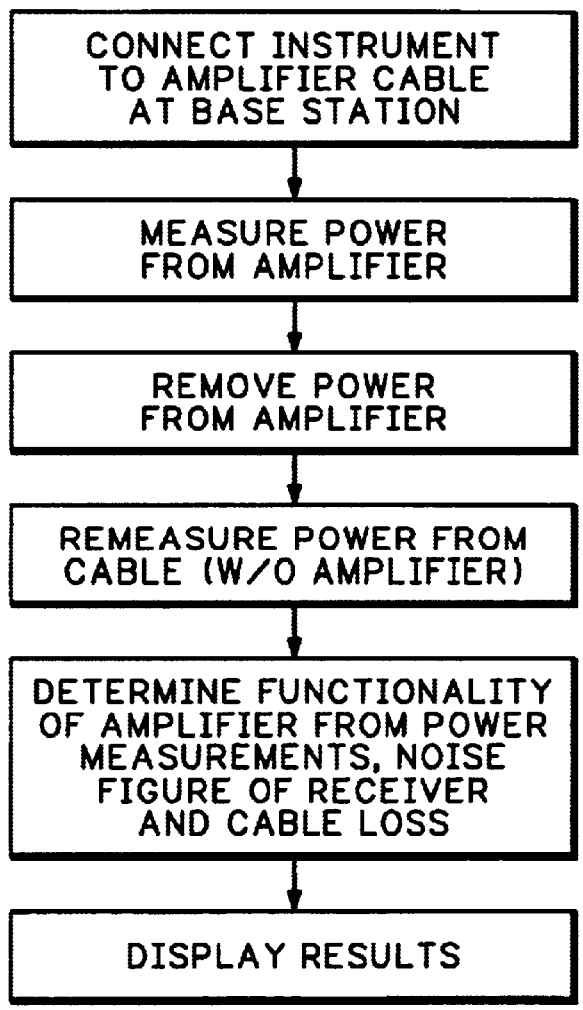
FIG. 3 is a flow chart view of a method of remotely estimating the functionality of an amplifier according to the present invention.

To estimate the functionality of the amplifier 11 at the top of the tower 12 from the base station 18, the RF measurement instrument 30 is coupled to the coax cable 20 that is coupled to the amplifier, as indicated by the process flow in FIG. 3. The process involves turning on and off the amplifier 11 from the base station 18 while measuring the noise power across a frequency spectrum with the RF measurement instrument 30. Knowing the noise figure of the base station receiver and/or the RF measurement instrument 30, which is generally provided by the manufacturer, and the loss in the length of cable 20 between the amplifier 11 and the RF measurement instrument, which loss may be determined during installation by using a time domain reflectometer to measure the ratio between applied and reflected energy when the remote end of the cable is either shorted or opened or which loss may be estimated from manufacturer's data concerning loss per 100' of cable, the functionality of the amplifier may be estimated. If the noise from the amplifier 11, amplified by its gain, is sufficient to overcome the noise of the receiver including the transmission line 20 and associated connection device loss, then the amplifier is likely functional. This method incorporated into the RF measurement instrument 30 of FIG. 2 may be automated to provide the functionality estimate of the remotely mounted amplifier 11. The internal power insertion unit 42 replaces the one that is normally part of the base station 18.

The method is even better if a signal is present, assuming that the amplifier 11 does not have a bypass relay associated with it. Then the difference in signal strength as measured by the RF measurement instrument 30 when the amplifier 11 is powered on and off is significant if the amplifier is functioning properly. The signal may be provided from a transmitting antenna proximate the receiver antennas 16, such as the transmitter antennas 14 for the base station 18. When the preamplifier 11 does incorporate a bypass relay, then an actual measurement of S/N ratio with preamplifier may be compared to an actual measurement of S/N ratio in bypass mode (power removed). This may be used to provide the noise figure for the preamplifier 11. The signal power ratio ON/OFF provides gain.

The RF measurement instrument 30 may be used to sweep across a range of frequencies to determine which channels of the system are receiving signals and which are not. Then when the results for the powered and unpowered states of the amplifier 11 are obtained, the results for the channels where there is an absence of signal and for the channels where there is a signal constantly as determined by repetitive measurements may be compared to appropriate threshold values based on the parameters mentioned above. The estimate of the functionality of the amplifier 11 may be displayed as an average signal to noise ratio of the amplifier, or as an ON/OFF ratio of signal power and/or noise power.

Additional confidence in the functionality of the amplifier 11 may be attained by also measuring the current that the amplifier draws from the power supply. It the amount of current is correct, then further confidence of proper operation of the amplifier 11 is reinforced.

Thus the present invention provides a method of remotely estimating the functionality of an amplifier by measuring the noise and/or constant signal power outputs when the amplifier is powered on and powered off, taking into consideration the noise figure of the measuring instrument or other receiver and the transmission medium including any connection device loss between the amplifier and the measuring instrument.

What is claimed is:

1. A method of remotely providing an estimate of the functionality of an amplifier using a measurement instrument coupled to an output of the amplifier via a transmission medium comprising the steps of:
   a) obtaining measures of output power from the amplifier in both powered and unpowered states;
   b) calculating from the measures a ratio for the output power of the amplifier between the powered and unpowered states;
   c) comparing the ratio to a threshold value; and
   d) displaying the estimate as a function of the ratio.

2. The method as recited in claim 1 further comprising the step of coupling power to the amplifier via the measurement instrument.

3. The method as recited in claim 1 further comprising the step of establishing parameter values from which the threshold value is derived.

4. The method as recited in claim 3 wherein the establishing step further comprises the steps of:
   a) determining a loss for the transmission medium; and
   b) determining a loss for any coupling device used between the amplifier and the measurement instrument, the losses being the parameter values.

5. The method as recited in claim 1 wherein the obtaining step comprises the step of acquiring frequency spectrum data for the output power over a defined measurement frequency spectrum range in both the powered and unpowered states from which the measures are obtained.

6. The method as recited in claim 5 wherein the obtaining step further comprises the steps of:
   a) analyzing the frequency spectrum data for the presence of signals in the measurement frequency spectrum range;
   b) repeating the acquiring and analyzing steps to determine the presence of a constant signal within the measurement frequency spectrum range;
   c) obtaining measures of the output power in both the powered and unpowered states for the constant signal; and
   d) calculating a ratio of the measures for the constant signal between the powered and unpowered states.

7. The method as recited in claim 5 further comprising the steps of:
   a) analyzing the frequency spectrum data for the absence of signals in a region of the measurement frequency spectrum range; and
   b) obtaining measures of the output power in both the powered and unpowered states over the region wherein the measures represent noise power for the amplifier.

8. The method as recited in claims 5, 6 or 7 wherein the displaying step further comprises the step of displaying the frequency spectrum data in both the powered and unpowered states.

9. The method as recited in claim 1, wherein the amplifier is located adjacent to a receiver antenna and has an input coupled to the receiver antenna, further comprising the step of generating a transmitted signal having a frequency within a measurement frequency spectrum range from a transmitter antenna located proximate to the receiver antenna.

10. The method as recited in claim 9 wherein the obtaining step comprises the step of obtaining measures of the output power in both the powered and unpowered states at the frequency of the transmitted signal.

11. The method as recited in claim 1 wherein the displaying step further comprises the step of displaying a numerical percentage value representative of a confidence level of the estimate as a function of the measures and the threshold value.

12. A method of remotely providing an estimate of the functionality of an amplifier using a measurement instrument coupled to an output of the amplifier via a transmission medium comprising the steps of:
   a) coupling power to the amplifier via the measurement instrument;
   b) acquiring frequency spectrum data from the output over a measurement frequency spectrum range in both powered and unpowered states;
   c) obtaining from the frequency spectrum data measures of output power for the amplifier in both the powered and unpowered states;
   d) calculating a ratio for the measures between the powered and unpowered states;
   e) comparing the ratio to a threshold value; and
   f) displaying the estimate as a function of the ratio.

13. The method as recited in claim 12 further comprising the step of establishing parameter values from which the threshold value is derived.

14. The method as recited in claim 13 wherein the establishing step further comprises the steps of:
   a) determining a loss for the transmission medium; and
   b) determining a loss for any coupling device used between the amplifier and the measurement instrument, the losses being the parameter values.

15. The method as recited in claim 12, wherein the amplifier is located adjacent to a receiver antenna and has an input coupled to the receiver antenna, further comprising the step of generating a transmitted signal within the measurement frequency spectrum range from a transmitter antenna located proximate to the receiver antenna.

16. The method as recited in claim 15 wherein the obtaining step comprises the step of obtaining measures for the output power of the amplifier in both the powered and unpowered states at the frequency of the transmitted signal.

17. The method as recited in claim 12 further comprising the steps of:
   a) analyzing the frequency spectrum data for the presence of signals in the measurement frequency spectrum range; and
   b) repeating the acquiring and analyzing steps to determine the presence of a constant signal within the measurement frequency spectrum range, the frequency spectrum data for the constant signal being provided to the obtaining step.

18. The method as recited in claim 12 further comprising the step of analyzing the frequency spectrum data for the absence of signals in a range of the measurement frequency spectrum range, the frequency spectrum data for the range, representing noise power, being provided to the obtaining step.

19. The method as recited in claims 12, 17 or 18 wherein the displaying step further comprises the step of displaying the frequency spectrum data.

20. The method as recited in claim 12 wherein the displaying step further comprises the step of displaying a numerical percentage value representative of a confidence level of the estimate as a function of the ratio and the threshold value.

21. A method of providing an estimate of the functionality of an amplifier using a measurement instrument coupled medium to an output of the amplifier via a transmission comprising the steps of:
   a) acquiring frequency spectrum data over a measurement frequency spectrum range from the output in both powered and unpowered states;
   b) analyzing the frequency spectrum data for the presence and absence of signals within the measurement frequency spectrum range;
   c) obtaining measures for the average output power of the amplifier in both the powered and unpowered states for a region of the measurement frequency spectrum range having an absence of signals and for a frequency within the measurement frequency spectrum range representing a constant signal;
   d) calculating a ratio of the measures for the region and a ratio of the measures for the constant signal between the powered and unpowered states;

e) comparing the respective ratios to respective threshold values; and f) displaying the estimate as a function of the ratios.

22. The method as recited in claim 21 further comprising the step of coupling power to the amplifier via the measurement instrument.

23. The method as recited in claim 21 further comprising establishing parameter values for setting the threshold values.

24. The method as recited in claim 23 wherein the establishing step comprises the steps of:

a) determining a loss for the transmission medium; and b) determining a loss for any coupling device used between the amplifier and the measurement instrument, the losses being the parameter values.

25. The method as recited in claim 21, wherein the amplifier is located adjacent to a receiver antenna and has an input coupled to the receiver antenna, further comprising the step of generating a transmitted signal within the measurement frequency spectrum range from a transmitter antenna located proximate to the receiver antenna.

26. The method as recited in claim 25 wherein the obtaining step comprises the step of obtaining the measures at the frequency of the transmitted signal.

27. The method as recited in claims 21 or 26 wherein the displaying step comprises the step of displaying the frequency spectrum data.

28. The method as recited in claim 21 wherein the displaying step comprises the step of displaying a numerical percentage value representative of a confidence level of the estimate as a function of the ratios and the threshold values.

* * * * *